(12) United States Patent
Troy et al.

(10) Patent No.: US 9,206,942 B2
(45) Date of Patent: Dec. 8, 2015

(54) INSTRUMENT MOUNTING APPARATUS

(71) Applicants: Raymond Steven Troy, Chicago, IL (US); Daniel Shane Vande Voorde, Ashland, MO (US); Clinton Farrell Matthews, Columbia, MO (US)

(72) Inventors: Raymond Steven Troy, Chicago, IL (US); Daniel Shane Vande Voorde, Ashland, MO (US); Clinton Farrell Matthews, Columbia, MO (US)

(73) Assignee: Amiralin, LLC, Columbia, MO (US)

( * ) Notice: Subject to any disclaimer, the term of this patent is extended or adjusted under 35 U.S.C. 154(b) by 70 days.

(21) Appl. No.: 14/060,331

(22) Filed: Oct. 22, 2013

(65) Prior Publication Data

US 2015/0108301 A1   Apr. 23, 2015

(51) Int. Cl.
*A47G 1/17* (2006.01)
*F16M 13/02* (2006.01)
*B25H 3/00* (2006.01)

(52) U.S. Cl.
CPC ............... *F16M 13/022* (2013.01); *B25H 3/00* (2013.01)

(58) Field of Classification Search
CPC ... F16M 13/022; A47F 5/0006; A44B 11/005
USPC ......................................................... 248/206.5
See application file for complete search history.

(56) References Cited

U.S. PATENT DOCUMENTS

| | | | | |
|---|---|---|---|---|
| 4,479,596 A | * | 10/1984 | Swanson | 224/236 |
| 4,897,768 A | * | 1/1990 | Thul | 362/191 |
| 5,025,966 A | * | 6/1991 | Potter | 224/183 |
| 5,445,303 A | * | 8/1995 | Cawile, Jr. | 224/222 |
| 5,887,776 A | * | 3/1999 | Munoz | 224/575 |
| 6,209,769 B1 | * | 4/2001 | Seals et al. | 224/583 |
| 2004/0089778 A1 | * | 5/2004 | Valentine et al. | 248/229.13 |
| 2007/0034761 A1 | * | 2/2007 | De Boer | 248/309.1 |
| 2008/0000055 A1 | * | 1/2008 | Kuhlmann | 24/16 PB |
| 2010/0116955 A1 | * | 5/2010 | Hayes et al. | 248/206.5 |
| 2014/0042294 A1 | * | 2/2014 | Marzynski et al. | 248/693 |

* cited by examiner

*Primary Examiner* — Mark Wendell
(74) *Attorney, Agent, or Firm* — Mashburn Law Office, LLC; Donna Denise Mashburn

(57) ABSTRACT

An instrument mounting apparatus having a flexible vertical strap, a magnet attached near the top of the vertical strap, wherein the magnet is operable to couple the strap to an external member, and the strap is operable to be attached to an instrument near the bottom of the strap.

8 Claims, 5 Drawing Sheets

INSTRUMENT MOUNTING APPARATUS

CROSS REFERENCES TO RELATED APPLICATIONS

Applicant claims priority under 35 U.S.C. §119(e) to provisional application No. 61/755,506 filed on Jan. 23, 2013.

FIELD OF INVENTION

The present invention relates generally to an instrument mounting apparatus that magnetically mounts to an external member. In particular, the invention relates to an instrument mounting apparatus having a flexible strap and a magnet attached near the top of the strap, wherein the magnet is operable to magnetically couple the strap to the external member, and the strap is operable to be attached to an instrument.

BRIEF DESCRIPTION OF THE DRAWINGS

The accompanying drawings illustrate embodiments of the invention and are for illustration by way of example and not limitations.

DETAILED DESCRIPTION OF THE INVENTION

Figure 1:
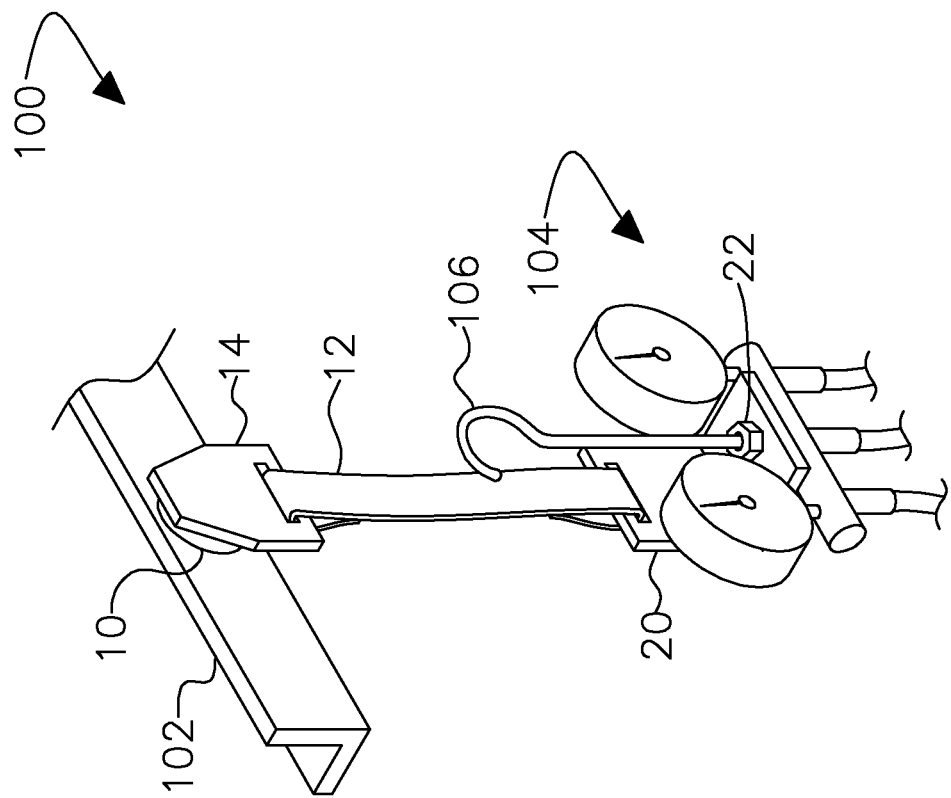
FIG. 1 illustrates a top perspective view of an instrument mounting apparatus including a flexible strap and a magnet, magnetically mounted to an external member, in accordance with an embodiment of the invention.
Figure 2:
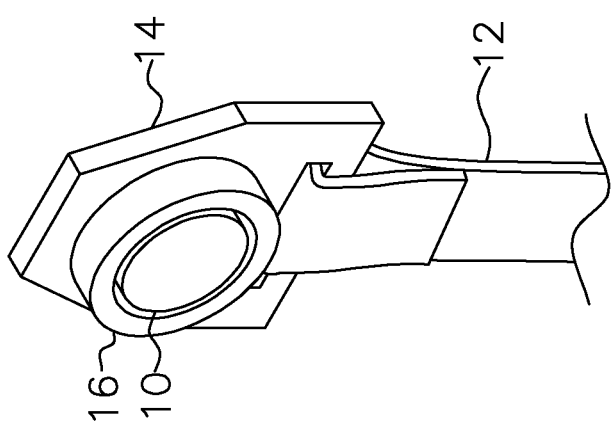
FIG. 2 illustrates a top perspective view of the magnet in FIG. 1, in accordance with an embodiment of the invention.

The present invention is to an instrument mounting apparatus 100 as shown in FIGS. 1-5. Specifically, the invention is an instrument mounting apparatus 100 including a magnet 10 and a flexible strap 12, wherein the magnet 10 is attached near the top of the flexible strap 12, the apparatus 100 is operable to be magnetically mounted to an external member 102 (FIG. 1), and the apparatus 100 is operable to be attached to an instrument 104 near the bottom of the strap 12. The instrument 104 can be any device that is desired to be hung, displayed, or mounted. Typical devices can include HVAC gauges (FIGS. 1, 3-5), mechanic lights, voltmeters, paint cans, and tool and hardware containers. Some devices such as the HVAC instrument shown may have an existing mounting hook 106 that is demoted in favor of the present invention.

The magnet 10 (detailed in FIG. 2) can be made of any type of magnetic material, including neodymium, ceramic, cobalt, and alnico, and can be of any shape including square, round, and elongated. The magnet 10 can be of varying strength including from the range of 50 pound force to 150 pound force. The magnet 10 can be attached to the strap 12 in a variety of ways, including a fastener such as a screw, clamp, ring, pin, or string, or the magnet 10 could be embedded directly into the strap or woven into the strap material.

In a particular embodiment, shown in FIGS. 1-5, the apparatus 100 includes a top bracket 14 wherein the magnet 10 is attached to the top bracket 14, and the top bracket is attached near the top of the strap 12. In a particular embodiment, shown in FIG. 2, the top bracket 14 includes a "bull nose" protrusion 16 that protects the edge of the magnet 10 from unnecessary wear.

Figure 3:
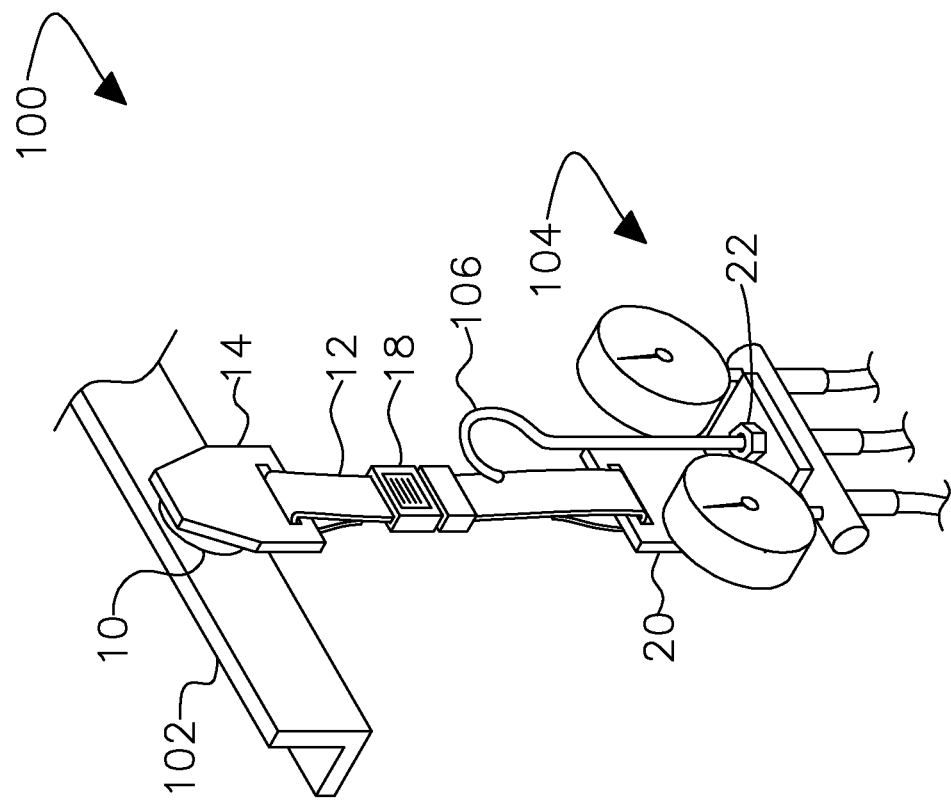
FIG. 3 illustrates a top perspective view of an instrument mounting apparatus including a flexible strap having a joint operable to be disconnected, in accordance with an embodiment of the invention.
Figure 4:
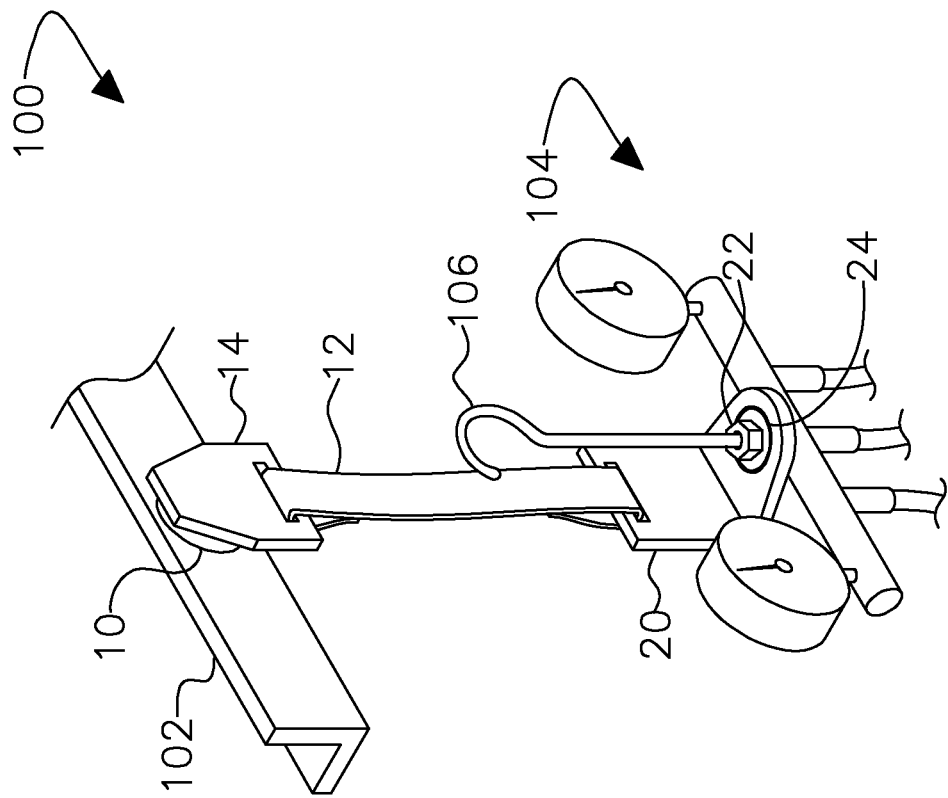
FIG. 4 illustrates a top perspective view of an instrument mounting apparatus including a swivel bracket, in accordance with an embodiment of the invention.
Figure 5:
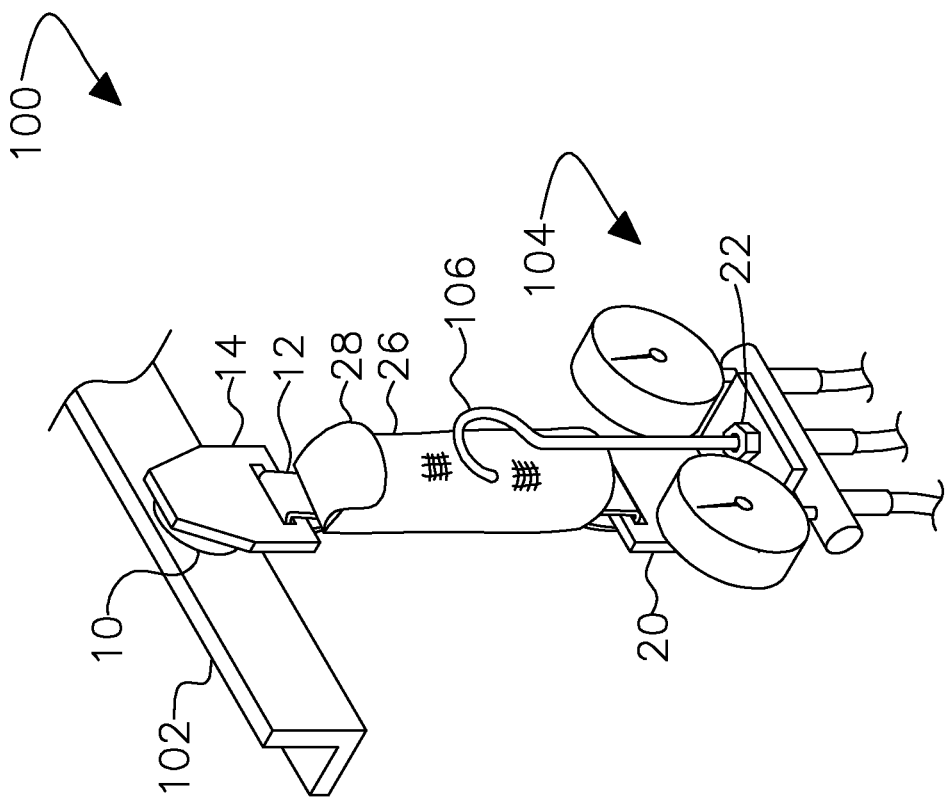
FIG. 5 illustrates a top perspective view of an instrument mounting apparatus including a pouch, in accordance with an embodiment of the invention.

The strap 12 (FIGS. 1-5) is generally flexible and can be made from a variety of materials including synthetic, leather, rope, metal links, metal wire, plastic, and rubber. The material can be woven, braided, linked, or solid. The strap 12 can be generally circular in cross section (with a diameter of between 0 and 2 inches), or arbitrarily thin (from 0 and 0.5 inches) with a longitudinal width of from 0.5 to 3 inches. The strap 12 can be from 3 inches to 36 inches in length and can present an effective length that can be increased or decreased. In a particular embodiment, as shown in FIG. 3, the strap 12 includes a separable joint 18 operable to be selectively connected and disconnected. The joint 18 can be made from a variety of configurations including an interlocking snap buckle, a snap button, and a hook and receiver loop.

In a particular embodiment (FIGS. 1, 3-5) the apparatus 100 further includes a bottom bracket 20 attached near the bottom of the strap 12. The bottom bracket 20 is removably attached to the instrument 104, and can be attached using a fastener 22 such as a nut, clamp, clasp, or button, or can be attached directly to the instrument 100 with glue, stitching, or interlocking geometry. In a particular embodiment (FIG. 4) the bottom bracket 20 can further include a swivel 24 operable to freely pivot or rotate in relation to the instrument 100.

In a particular embodiment (FIG. 5), the strap 12 further includes a pouch 24 operable to receive a variety of tools, instruments, hardware, or waste. The pouch 24 can include a cover 26 operable to be selectively opened and closed. The pouch 24 and/or cover 26 can be made from a variety of material including synthetic, leather, rope, metal links, metal wire, plastic, and rubber. The pouch 24 can be attached to the strap by glue, stitching, fasteners, or interlocking geometry.

Thus, there has been described an instrument mounting apparatus 100. It is apparent to those skilled in the art, however, that many changes, variations, modifications, other uses, and applications are possible and also such changes, variations, modifications, other uses, and applications which do not depart from the spirit and scope of the invention are deemed covered by the invention, which is limited only by the claims which follow.

What is claimed is:

1. An instrument mounting apparatus, comprising:
   a flexible vertical strap wherein the flexible vertical strap includes a separable joint intermediate the top and bottom of the strap, operable to be selectively connected and disconnected;
   a magnet attached near the top of the vertical strap, wherein the magnet is operable to couple the strap to an external member; and
   a bottom bracket attached near the bottom of the vertical strap, wherein the bottom bracket is operable to be attached to an instrument and the bottom bracket includes a swivel operable to freely rotate or pivot.

2. The instrument mounting apparatus of claim 1, wherein the apparatus further includes a top bracket attached near the top of the vertical strap, and the magnet is attached to the top bracket.

3. The instrument mounting apparatus of claim 2, wherein the top bracket includes a "bull nose" protrusion extending from the bracket and generally adjacent to the edges of the magnet.

4. The instrument mounting apparatus of claim 1, wherein the strap presents an effective length operable to be increased or decreased.

5. The instrument mounting apparatus of claim 1, wherein the apparatus further includes a pouch attached to the strap.

6. The instrument mounting apparatus of claim 5, wherein the pouch is removably attached to the strap.

7. The instrument mounting apparatus of claim 5, wherein the pouch includes a cover operable to be selectively opened or closed.

8. An instrument mounting apparatus, comprising:
 a flexible vertical strap;
 a top bracket attached near the top of the vertical strap;
 a magnet attached to the top bracket, wherein the magnet is operable to couple the strap to an external member; and
 a bottom bracket attached near the bottom of the vertical strap, wherein the bottom bracket is operable to be attached to an instrument and the bottom bracket includes a swivel operable to freely rotate or pivot.

* * * * *